US006941040B2

(12) United States Patent
Devenyi et al.

(10) Patent No.: US 6,941,040 B2
(45) Date of Patent: Sep. 6, 2005

(54) SELECTABLE FILTER MODULE FOR OPTICAL FIBER TRANSMISSION SYSTEM, AND METHOD OF FILTERING LIGHT

(75) Inventors: Gabor Devenyi, Penetang (CA); Brien Ross, Wyevale (CA); James Whitty, Midland (CA)

(73) Assignee: Raytheon Company, Waltham, MA (US)

( * ) Notice: Subject to any disclaimer, the term of this patent is extended or adjusted under 35 U.S.C. 154(b) by 330 days.

(21) Appl. No.: 10/164,496

(22) Filed: Jun. 5, 2002

(65) Prior Publication Data

US 2003/0228097 A1 Dec. 11, 2003

(51) Int. Cl.[7] .............................. G02B 6/00; G02B 27/00
(52) U.S. Cl. ......................................... 385/31; 385/140
(58) Field of Search ............................ 385/31, 140, 36, 385/24, 15, 37, 33, 34

(56) References Cited

U.S. PATENT DOCUMENTS

| | | | | |
|---|---|---|---|---|
| 4,904,044 A | * | 2/1990 | Tamulevich | 385/56 |
| 5,805,759 A | * | 9/1998 | Fukushima | 385/140 |
| 5,852,505 A | * | 12/1998 | Li | 398/58 |
| 6,144,788 A | * | 11/2000 | Ang et al. | 385/31 |
| 6,144,794 A | * | 11/2000 | Mao et al. | 385/140 |
| 6,205,266 B1 | * | 3/2001 | Palen et al. | 385/15 |
| 6,285,810 B1 | | 9/2001 | Fincato et al. | |
| 6,430,340 B1 | * | 8/2002 | Iida et al. | 385/33 |
| 6,459,844 B1 | * | 10/2002 | Pan | 385/140 |
| 6,483,982 B1 | * | 11/2002 | Takahashi | 385/140 |
| 6,553,175 B2 | * | 4/2003 | Jaspan | 385/140 |
| 6,582,363 B2 | * | 6/2003 | Adachi et al. | 600/178 |
| 6,606,446 B1 | * | 8/2003 | Shen et al. | 385/140 |
| 2002/0044721 A1 | | 4/2002 | Bjorklund | |

\* cited by examiner

Primary Examiner—Joseph Williams
Assistant Examiner—Dalei Dong
(74) Attorney, Agent, or Firm—William C. Schubert; Karl A. Vick

(57) ABSTRACT

An optical fiber system includes an optical fiber light transmission system having a light path therethrough, and a filter module positioned to controllably place light filters into the light path of the optical fiber light transmission system. The filter module includes a movable support on which light filters are mounted, and a drive mechanism operably connected to the movable support to controllably move the at least one light filter into and out of the light path. The drive mechanism is operated to move the light filters into or out of the light path.

19 Claims, 3 Drawing Sheets

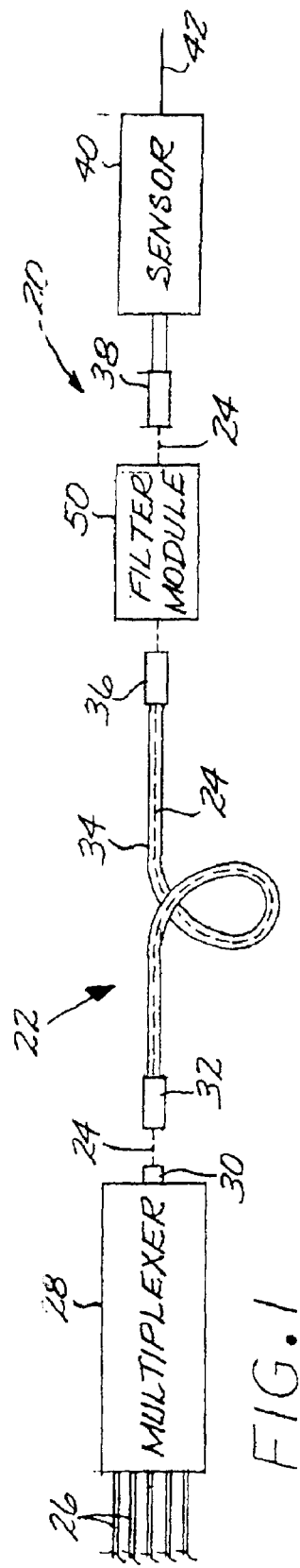
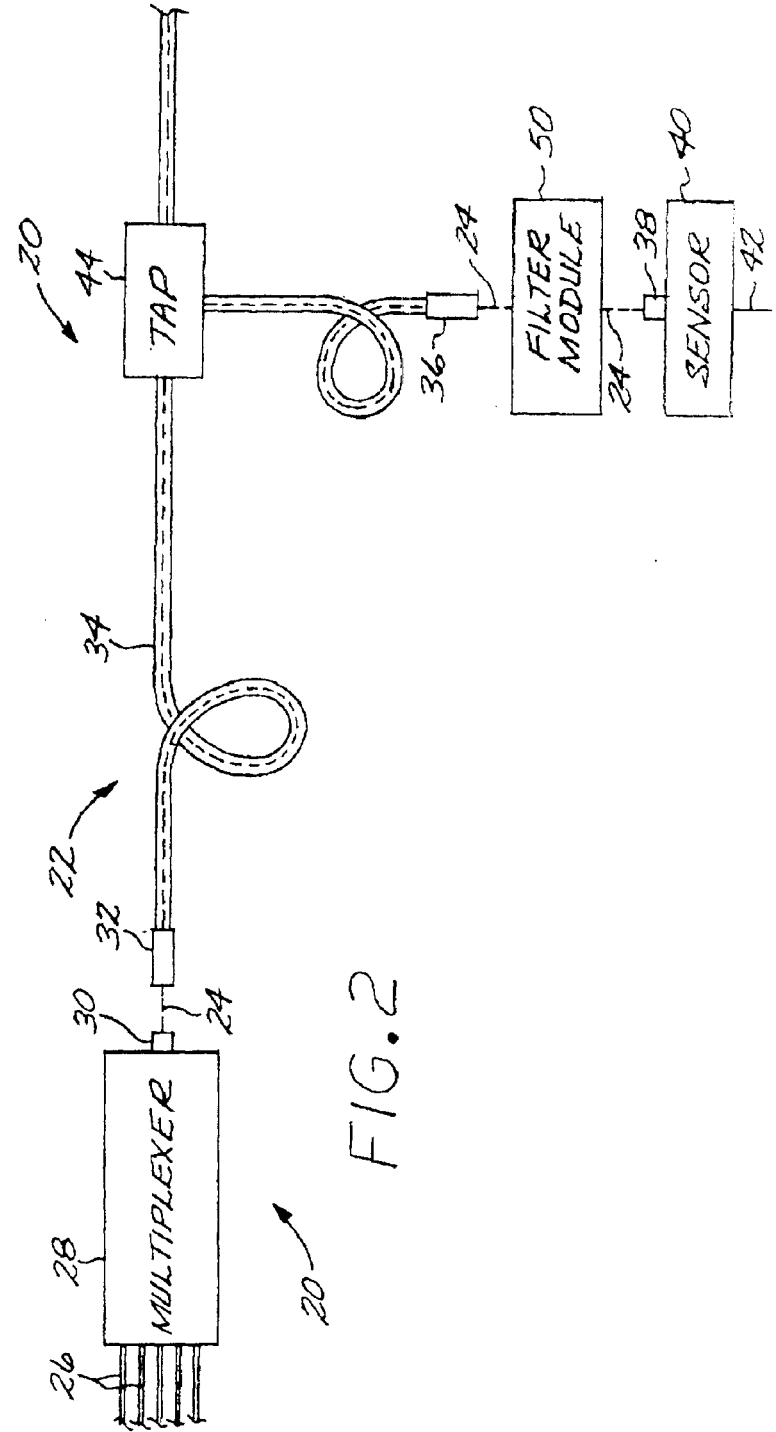

SELECTABLE FILTER MODULE FOR OPTICAL FIBER TRANSMISSION SYSTEM, AND METHOD OF FILTERING LIGHT

This invention relates to optical fiber-based apparatus and, more particularly, to the filtering of light in a wavelength division multiplexed apparatus.

BACKGROUND OF THE INVENTION

An optical fiber propagates light by total internal reflection. A light beam introduced into one end of the optical fiber is propagated essentially without any loss of energy to the other end of the optical fiber, even though the optical fiber may be quite long. This property of the optical fiber is utilized in light-based communication systems in which information is encoded onto a light beam, introduced into the optical fiber, propagated through the optical fiber, received at the other end of the optical fiber, and processed to recover the information. Because of its high frequency, the light beam may carry a great deal of information.

The capacity of the optical fiber to carry information may be further increased by simultaneously transmitting a number of light beams through the optical fibers. For example, a first light beam of a first wavelength (i.e., a first channel) may carry information for a first user, a second light beam of a second wavelength (i.e., a second channel) may carry information for a second user, and so on. The single optical fiber may carry a large number of light beams.

In one approach, dense wavelength division multiplexing (DWDM), the light beams of slightly different wavelengths are multiplexed together, transmitted through the optical fiber, and de-multiplexed at the receiving end to separate the various light beams. There is a relatively limited total wavelength range that may be used, due to other technical limitations. For many applications, the wavelengths must lie in a specific narrow range, as for example between 1528 and 1565 nanometers. The practical limit for the number of light beams that may be transmitted at once within such a total wavelength range is the ability to isolate the light beams and filter the light beams to ensure wavelength separation between the light beams. If too many light beams are transmitted at once so that their wavelengths are too close together, it will not be possible to isolate them in a wavelength sense, and there will be cross talk and interference between the light beams.

Filters have been developed to wavelength-isolate the light beams. Such filters are placed into the light beam to pass only a selected wavelength of light. Examples of such filters are tunable etalon filters and graded thin-film coatings. These filters are operable and are widely used, but they have shortcomings in their ability to isolate the various wavelengths, particularly as the wavelengths are made ever-closer together as the density of communications is increased. There is accordingly a need for an improved approach to light filtering, particularly in DWDM and other types of optical fiber communications systems. The present invention fulfills this need, and further provides related advantages.

SUMMARY OF THE INVENTION

The present invention provides an optical fiber system in which the light beam is filtered in a highly effective, controllable manner. This approach is particularly effective in a light-based communication system, such as a coarse wavelength division multiplexing (CWDM) or a dense wavelength division multiplexing (DWDM) communication system. The light filtering is accomplished in an optimal manner, without any dependence upon filter tunability and without any use of filters that may not achieve sufficient wavelength isolation.

In accordance with the invention, an optical fiber system comprises an optical fiber light transmission apparatus having a light path therethrough, and a filter module positioned to controllably place a light filter into the light path of the optical fiber light transmission apparatus and remove the light filter from the light path. The filter module comprises a movable support on which at least one light filter (and preferably a plurality of light filters such as discrete-range light filters) is mounted, and a drive mechanism operably connected to the movable support to controllably move the at least one light filter into and out of the light path.

The optical fiber light transmission apparatus may, for example, comprise a coarse or a dense wavelength division multiplexed apparatus. In an example of placement, the optical fiber light transmission apparatus may comprise a first light collimator, and a second light collimator. The light path extends in free-space propagation between the first light collimator and the second light collimator. The filter module is positioned so that the at least one light filter may be controllably positioned in the free-space light path between the first light collimator and the second light collimator.

In a preferred form of the drive mechanism, a lead screw is drivably connected to the movable support. A stepper motor drives the lead screw. A positional indicating device may also be included for indicating the position of the movable support, independently of the position indicated by the stepper motor. This drive mechanism is operated to controllably place the selected light filter into the light path and controllably remove the selected light filter from the light path.

The present approach utilizes a series of separate, individual light filters to accomplish the wavelength isolation. These individual light filters may be optimized for specific filtering requirements and specific wavelengths. The light filters may be band-pass, band-reject, high-pass, low-pass, or any other type of light filter that may be devised for particular requirements and wavelengths, without regard to achieving controllability of the filter and without regard for achieving multiple functionality of the light filter. Other types of light filters that are controllable or otherwise of multiple functionalities in a single light filter are known, but the effort to achieve multiple functionality of the single light filter compromises the capability of the light filter for a specific application. The present approach is readily constructed and operated, and achieves the highest wavelength-isolation performance possible.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic depiction of a first embodiment of a fiber-optic communication system;

FIG. 2 is a schematic depiction of a second first embodiment of a fiber-optic communication system;

DETAILED DESCRIPTION OF THE INVENTION

Figure 3:
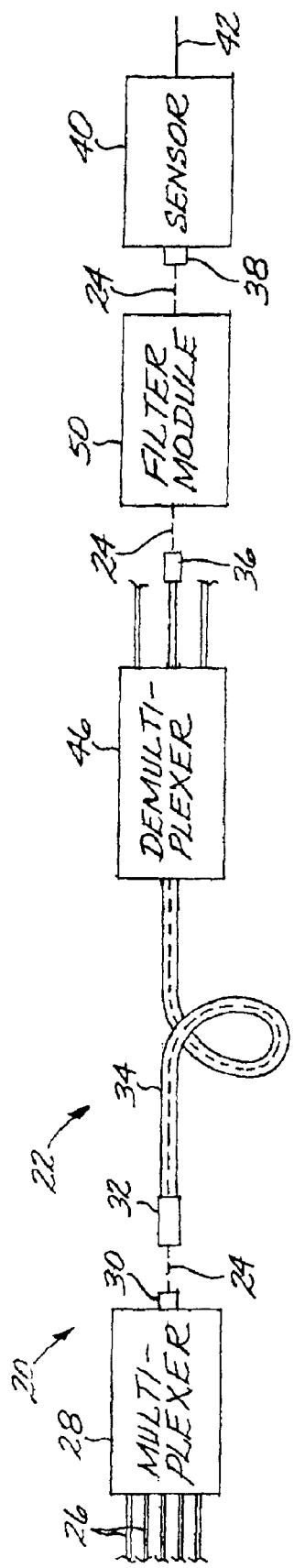
FIG. 3 is a schematic depiction of a third embodiment of a fiber-optic communication system.

FIG. 1 depicts an optical fiber system 20, in this preferred case a dense wavelength division multiplexing (DWDM) optical fiber communication system or coarse wavelength division multiplexing (CWDM) optical fiber communication system. The wavelength or frequency spacing between the multiplexed wavelengths or frequencies is also termed the channel spacing. The channel spacing in DWDM is typically smaller than that in CDWM. Typically, the frequency channel spacing in DWDM is about 100 GHz, and the channel spacing in CWDM is about 400 GHz. For the present purposes, DWDM is taken to have a channel spacing of less than about 200 GHz, and CWDM is taken to have a channel spacing of 200 GHz or more.

The optical fiber system 20 includes an optical fiber light transmission system 22 having a light path 24 therethrough. In the illustrated embodiment of FIG. 1, a number of channels 26 of information already encoded onto individual light beams are supplied to an optical multiplexer 28. The optical multiplexer 28 generates a light output signal provided to an input-end first collimator 30. The light passes from the input-end first collimator 30 to an input-end second collimator 32 and is inserted into an optical fiber 34. The light path 24 passes through the optical fiber to an output-end first collimator 36, and travels through free space to an output-end second collimator 38. From the output-end second collimator 38 the light path 24 travels to appropriate instrumentation, in this case a sensor 40 with an output signal 42.

FIGS. 2–3 depict two other commonly encountered architectures. In the approach of FIG. 2, a tap 44 extracts a sampling of the full light signal traveling on the optical fiber 34 and sends the extracted sampled signal to the sensor 40. In the approach of FIG. 3, the light signal traveling on the optical fiber 34 is demultiplexed by a demultiplexer 46, and one or more of the demultiplexed signals is sent to the sensor 40. Otherwise, the embodiments of FIGS. 2–3 are like that of FIG. 1, and the prior description is incorporated. Such optical fiber systems 20 as shown in FIGS. 1–3 are known in the art except for the features discussed herein. FIGS. 1–3 present highly schematic depictions of such an optical fiber light transmission system 22 so that the placement and functioning of the filter module discussed next may be illustrated in relation to the optical fiber light transmission system 22.

Figure 4:
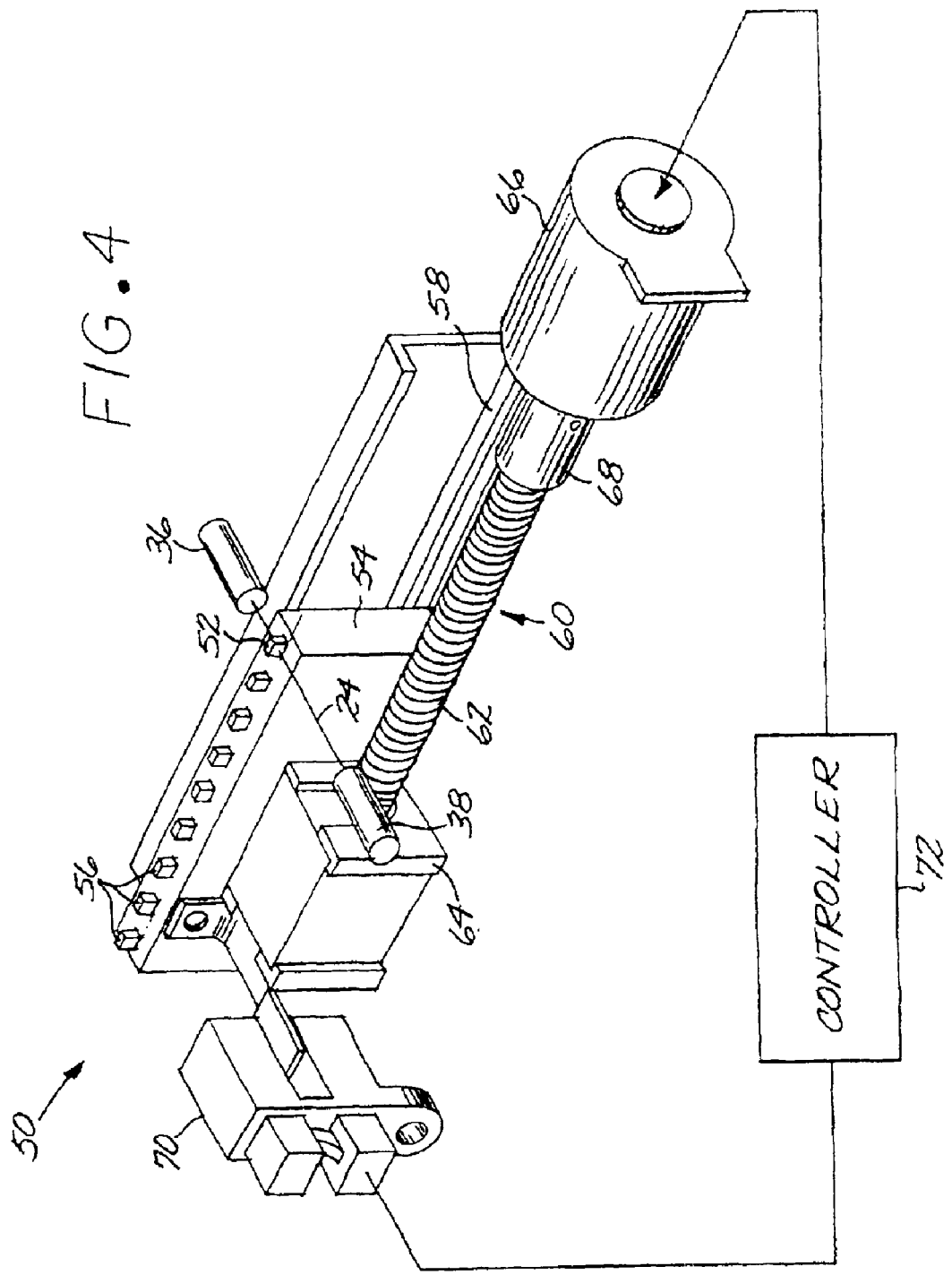
FIG. 4 is a perspective view of a filter module.

A filter module 50 is positioned to controllably place a light filter 52 into the light path 24 of the optical fiber light transmission system 22 and remove the light filter 52 from the light path 24. FIG. 4 depicts a preferred form of the filter module 50 in greater detail. In FIG. 1, the filter module 50 is positioned to place the light filter 52 into the light path 24 at a location between the output-end first collimator 36 and the output-end second collimator 38, but it could be placed into the light path 24 at any other suitable location such as between the input-end first collimator 30 and the input-end second collimator 32.

The filter module 50 comprises a movable support 54 upon which at least one light filter 52, and preferably a plurality of light filters 56, are mounted. The light filters 56 are preferably discrete-range light filters, which filter a fixed, specific range of wavelengths and are not themselves controllable. The filtered range may be of any desired type for which a light filter may be prepared, such as a low-pass, a high-pass, a band-pass, or a discrete narrow wavelength. Such light filters are known in the art.

The movable support 54 in the illustrated embodiment is linearly movable upon a linear bearing 58. A drive mechanism 60 is operably connected to the movable support 54 to controllably move the light filter 56 into and out of the light path 24. The drive mechanism 60 may be of any operable type. It preferably includes a lead screw 62 drivably connected to the movable support 54 through a drive nut 64. A controllable motor such as a stepper motor 66 with a rotating output 68 drives the lead screw 62, in turn driving the movable support 54 along the linear bearing 58.

Optionally but preferably, a positional indicating device 70 is provided in the drive mechanism 60 for indicating the position of the movable support 54. The stepper motor 66 moves the movable support to a selectable position, but the positional indicating device provides the position of the movable support 54 either continuously or at a fixed location such as an end point of the travel of the movable support. The output of the positional indicating device provides backup information and also positional calibration information, and may be used as input to a motor controller 72 that controls the operation of the stepper motor 66. The motor controller 72 may operate in either this feedback mode or in a non-feedback mode based on the step positions of the stepper motor 66. The positional indicating device 70 may be of any operable type. One example is a switch that indicates a limit of travel of the movable support 54, such as a mechanical or optical limit switch. The positional indicating device 70 may instead indicate the position of the movable support all along its track on the linear bearing 58, such as with a linear potentiometer.

Figure 5:
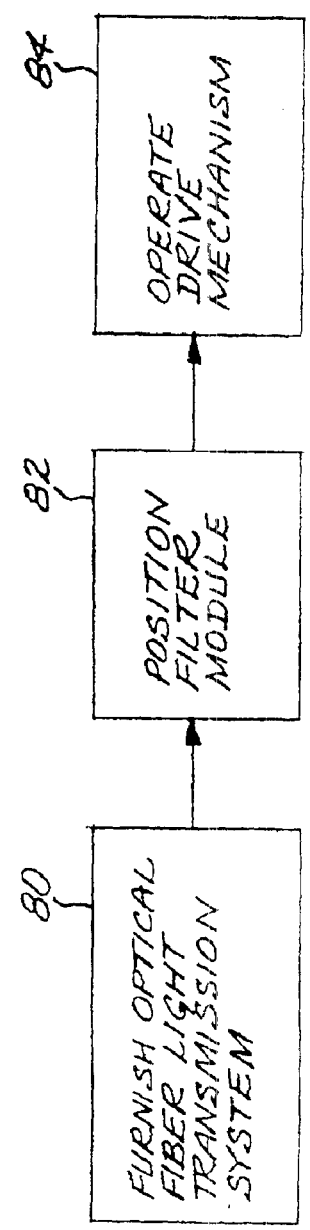
FIG. 5 is a block diagram of a method for practicing the invention.

FIG. 5 depicts a method for filtering light signals. An optical fiber light transmission system such as that described above, having a light path therethrough, is furnished, step 80. A filter module, such as that described above, is positioned to controllably place a light filter into the light path of the optical fiber light transmission system and remove the light filter from the light path, numeral 82. In the preferred embodiment, the filter module comprises a movable support on which at least one light filter is mounted, and a drive mechanism operably connected to the movable support to controllably move the at least one light filter into and out of the light path. The drive mechanism is operated, numeral 84, to controllably place the light filter into the light path and controllably remove the light filter from the light path. Other operable features of the present approach as described above may be utilized in conjunction with the method, and the prior description is incorporated.

The invention has been reduced to practice and found fully operable.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical fiber system comprising: an optical fiber light transmission system having a light path therethrough; and a filter module positioned to controllably place any one of a plurality of light filters into the light path of the optical fiber light transmission system and remove the light filter from the light path, the filter module comprising a moveable support on which the light filter is mounted, and a drive mechanism operable connected to the movable support to controllably move the light filter into and out of the light path.

2. The optical fiber system of claim 1, wherein the optical fiber light transmission system comprises a dense wavelength division multiplexed system.

3. The optical fiber system of claim 1, wherein the optical fiber light transmission system comprises a coarse wavelength division multiplexed system.

4. The optical fiber system of claim 1, wherein the optical fiber light transmission system comprises: a first light collimator, and a second light collimator, wherein the light path extends between the first light collimator and the second light collimator, and wherein the filter module is positioned so that the light filter may be controllably positioned in the light path between the first light collimator and the second light collimator.

5. The optical system of claim 1, where in the plurality of light filters comprises a plurality of discrete-range light filters.

6. The optical fiber system of claim 1, wherein the drive mechanism comprises
a lead screw drivably connected to the movable support.

7. The optical fiber system of claim 1, wherein the drive mechanism comprises
a stepper motor.

8. The optical fiber system of claim 1, wherein the drive mechanism comprises
a positional indicating device for indicating the position of the movable support.

9. An optical fiber system comprising:
a wavelength division multiplexed optical fiber light transmission system having a light path therethrough; and
a filter module positioned to controllably place a light filter into the light path of the optical fiber light transmission system and remove the light filter from the light path, the filter module comprising
a movable support on which a plurality of light filters is mounted, and
a drive mechanism operably connected to the movable support to controllably move the light filters individually into and out of the light path, wherein the drive mechanism comprises
a lead screw drivably connected to the movable support, and
a stepper motor driving the lead screw.

10. The optical fiber system of claim 9, wherein the optical fiber light transmission system comprises
a first light collimator, and
a second light collimator,
wherein the light path extends between the first light collimator and the second light collimator, and wherein the filter module is positioned so that the plurality of light filters may be controllably positioned individually in the light path between the first light collimator and the second light collimator.

11. The optical fiber system of claim 9, wherein the plurality of light filters comprises a plurality of discrete-range light filters.

12. The optical fiber system of claim 9, wherein the drive mechanism further comprises
a positional indicating device for indicating the position of the movable support.

13. A method of filtering light signals, comprising the steps of furnishing an optical fiber light transmission system having a light path therethrough; positioning a filter module to controllably place any one of a plurality of light filters into the light path of the optical fiber light transmission system and remove the light filter from the light path, the filter module comprising: a movable support on which the plurality of light filters is mounted, and a drive mechanism operable connected to the movable support to controllably move the light filter into and out of the light path; and operating the drive mechanism to controllably place the light filter into the light path and controllably remove the light filter from the light path.

14. The method of claim 13, wherein the step of furnishing includes the step of
furnishing an optical fiber light transmission system comprising a dense wavelength division multiplexed system.

15. The method of claim 13, wherein the optical fiber light transmission system comprises a coarse wavelength division multiplexed system.

16. The method of claim 13, wherein the step of furnishing includes the step of furnishing the optical fiber light transmission system comprising; a first light collimator, and a second light collimator, wherein the light path extends between the first light collimator and the second light collimator, and wherein the filter module is positioned so that the light filter may be controllably positioned in the light path between the first light collimator and the second light collimator.

17. The method of claim 13, wherein the step of positioning includes the step of
providing the at least one light filter comprising a plurality of light filters.

18. The method of claim 13, wherein the step of positioning includes the step of providing the plurality of light filters comprising a plurality of discrete-range light filters.

19. The method of claim 13, wherein the step of positioning includes the step of
providing the filter module with a positional indicating device for indicating the position of the movable support.

* * * * *